(12) United States Patent
Weaver et al.

(10) Patent No.: US 8,108,997 B2
(45) Date of Patent: Feb. 7, 2012

(54) METHODS AND APPARATUS FOR REPLACING OBJECTS ON HORIZONTAL SHAFTS IN ELEVATED LOCATIONS

(75) Inventors: Patrick Weaver, Tehachapi, CA (US);
Kirsh Alimohammed Afimiwala, Fairfield, CT (US); Norman Scott Winneguth, Tehachapi, CA (US); Fulton Jose Lopez, Clifton Park, NY (US); Michael Ulfert Homemann, Tehachapi, CA (US); Craig Leonard Christenson, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 12/787,389

(22) Filed: May 25, 2010

(65) Prior Publication Data

US 2011/0185568 A1    Aug. 4, 2011

Related U.S. Application Data

(62) Division of application No. 11/190,761, filed on Jul. 27, 2005, now Pat. No. 7,721,434.

(51) Int. Cl.
*B23P 6/00*     (2006.01)
*F03B 13/00*    (2006.01)

(52) U.S. Cl. .............. 29/889.1; 29/402.03; 29/402.08; 290/43; 290/44; 290/55

(58) Field of Classification Search .............. 29/888, 29/889.1, 700, 426.3, 402.03, 402.08; 254/334; 290/43, 44, 55; 415/119, 122.1, 170.1
See application file for complete search history.

(56) References Cited

U.S. PATENT DOCUMENTS

| | | | |
|---|---|---|---|
| 1,556,276 A | 10/1925 | Wilson | |
| 3,036,667 A | 5/1962 | Schilling | |
| 3,731,768 A | 5/1973 | Fetzer | |
| 5,267,397 A | 12/1993 | Wilcox | |
| 6,115,917 A * | 9/2000 | Nolan et al. | 29/889.1 |
| 6,749,393 B2 | 6/2004 | Sosonkina | |
| 6,837,673 B2 | 1/2005 | Ootoshi et al. | |
| 7,721,434 B2 * | 5/2010 | Weaver et al. | 29/889.2 |
| 7,944,079 B1 * | 5/2011 | Signore et al. | 290/55 |
| 2003/0035725 A1 | 2/2003 | Sosonkina | |
| 2004/0216294 A1 * | 11/2004 | Merrifield | 29/402.01 |
| 2005/0005562 A1 | 1/2005 | Henderson et al. | |
| 2007/0025840 A1 * | 2/2007 | Weaver et al. | 415/122.1 |
| 2010/0275442 A1 * | 11/2010 | Ohl, Jr. | 29/889.1 |
| 2011/0133473 A1 * | 6/2011 | Signore et al. | 290/55 |

(Continued)

FOREIGN PATENT DOCUMENTS

EP    1057770 B1    10/2005
(Continued)

*Primary Examiner* — Alexander P Taousakis
(74) *Attorney, Agent, or Firm* — Jim McGinness, Esq.; Armstrong Teasdale LLP (57) ABSTRACT

An apparatus for stabilizing a shaft in an essentially horizontal position while an anchoring object at one end of the shaft is replaced without removal of an object at the opposite end of the shaft that would otherwise tend to destabilize the shaft from its essentially horizontal position includes a half-spool member configured to clamp above and around the shaft to resist torque around the rotor, under supports configured to attach to the half-spool member and clamp an underside of the shaft below the half-spool member, and a hydraulic or mechanical brake configured to resist torque on the shaft when the brake is engaged.

12 Claims, 9 Drawing Sheets

U.S. PATENT DOCUMENTS

2011/0185568 A1 * 8/2011 Weaver et al. .................. 29/888

FOREIGN PATENT DOCUMENTS

| | | | |
|---|---|---|---|
| EP | 1748182 A2 * | 1/2007 | |
| WO | 0017086 | 3/2000 | |
| WO | 0238953 A2 | 5/2002 | |
| WO | 03100248 A1 | 12/2003 | |
| WO | 2004092577 A1 | 10/2004 | |
| WO | 2005031159 A1 | 4/2005 | |

* cited by examiner

METHODS AND APPARATUS FOR REPLACING OBJECTS ON HORIZONTAL SHAFTS IN ELEVATED LOCATIONS

CROSS REFERENCE TO RELATED APPLICATIONS

This application is a divisional application of U.S. patent application Ser. No. 11/190,761, filed Jul. 27, 2005 now U.S. Pat. No. 7,721,434, which is hereby incorporated by reference in its entirety.

BACKGROUND OF THE INVENTION

This invention relates generally to the servicing of apparatus in elevated locations. The methods and apparatus are particularly useful for servicing wind turbine generators, and more particularly to methods and apparatus that assist in the removal replacement of gearboxes in wind turbine generators without requiring the removal of blades from the wind turbine generator. However, the methods and apparatus described herein are not limited to servicing of wind turbines, and can be used to replace various types of objects on horizontal shafts in elevated locations.

Generally, a wind turbine includes a rotor having multiple blades. The rotor is mounted within a housing or nacelle positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators. In many wind turbine configurations, these generators are rotationally coupled to the rotor through a gearbox. The gearbox is or can be used to step up the inherently low rotational speed of the turbine rotor for the generator to efficiently convert mechanical energy to electrical energy. The electrical energy so produced is fed into a utility grid.

Although they are built to be quite reliable, gearboxes are mechanical devices that experience wear while in use. Also, even though gearboxes are mounted in a housing or nacelle and thus are protected from direct exposure to the elements, gearboxes can indirectly experience stress from extreme environmental conditions because of their coupling to large rotors. Thus, it will come as no surprise that gearboxes in wind turbines require occasional replacement.

In at least one known method for replacing a gearbox in a wind turbine, a crane is required to lift the gearbox out of an open nacelle. However, removing the gearbox also removes the object holding the end of the main shaft in place. In a typical wind turbine in a wind farm, a large rotor is fastened to the other end of the main shaft. This rotor has several long, heavy blades attached to a hub, so to prevent the main shaft from bending or the rotor from becoming tilted, the blades have to be removed from the rotor before the gearbox is removed. The sheer size of the wind turbines makes servicing difficult and expensive, as at the 65 to 80 meter height of some wind turbines used in generator farms, a large crane is required. Two cranes are required in some cases, because the entire rotor set must be removed in some cases and brought to the ground. A second crane is used to grab the bottom blade of the rotor and to "tail it out," i.e., make it flat in the air so that it can be set on the ground.

In some present wind turbine designs, the secondary bearing is the gearbox. A rotor having a mass of 76,000 pounds (34,466 Kg) produces an upward lift of about 56,000 pounds (25,400 Kg) at the gearbox.

Thus, known methods of replacement or servicing of a gearbox in a wind turbine are expensive and labor-intensive.

BRIEF DESCRIPTION OF THE INVENTION

Some aspects of the present invention therefore provide a method for replacing a first object in an apparatus at an elevated location, wherein the first object anchors a first end of an essentially horizontal shaft in the apparatus and wherein a weight of a second object at a second, opposite end of the shaft tends to destabilize the shaft from its essentially horizontal position when the first object is not present. The method includes lifting a shaft-restraining member or members to the apparatus, fastening the shaft-restraining member or members to the apparatus to thereby restrain the shaft from tilting when the first object is removed from the apparatus, removing the first object from the apparatus with the shaft-restraining member or members fastened to the apparatus, re-anchoring the first end of the shaft with a replacement object, and removing the shaft-restraining member or members from the apparatus after the shaft is re-anchored by the replacement object.

In another aspect, the present invention provides an apparatus for stabilizing a shaft in an essentially horizontal position while an anchoring object at one end of the shaft is replaced without removal of an object at the opposite end of the shaft that would otherwise tend to destabilize the shaft from its essentially horizontal position. The apparatus includes a half-spool member configured to clamp above and around the shaft to resist torque around the rotor, under supports configured to attach to the half-spool member and clamp an underside of the shaft below the half-spool member, and a hydraulic or mechanical brake configured to resist torque on the shaft when the brake is engaged.

In yet another aspect, the present invention provides an apparatus for stabilizing a shaft in an essentially horizontal position while an anchoring object at one end of the shaft is replaced without removal of an object at the opposite end of the shaft that would otherwise tend to destabilize the shaft from its essentially horizontal position. The apparatus includes a half-spool member having a mounting ear or flange configured to attach to a mounting flange of a bearing or journal of the shaft, and a semi-annular member configured to mount between and attach to an end of the half-spool member and a flange or hub of the shaft. The half-spool member and the semi-annular member are configured to bolt together, and the semi-annular member is configured to bolt to a flange of the shaft.

It will thus be seen that configurations of the present invention not only allow replacement of a heavy elevated object, e.g., a gearbox in a wind turbine, with only one crane, without removing the shaft that it is on or the hub or blades of a rotor at the opposite end of the shaft from the gearbox.

DETAILED DESCRIPTION OF THE INVENTION

More than one Figure must be referenced simultaneously to achieve a complete understanding of certain aspects of the present invention. To assist the reader, where possible, the first digit of a reference numeral for an item matches the first figure number in which the corresponding item is first described (but not necessarily the first figure in which the item appears). All further references to that item use that same reference numeral, even when describing other figures.

In some configurations of the present invention, an object (sometimes referred to herein as a "first object") is replaced in an apparatus in an elevated location. The first object anchors a first end of an essentially horizontal rotatable shaft in the apparatus. Another object (sometimes referred to herein as a "second object") at a second, opposite end of the shaft is present and tends to destabilize the shaft from its essentially horizontal position when the first object is not present. Some configurations of the present invention provide a temporary stabilization of the horizontal shaft that permits replacement of the first object without removal of the second object during the replacement procedure. In some configurations of the present invention, the apparatus is a wind turbine, the first object is a gearbox of the wind turbine, and the replacement object is a replacement gearbox. In some configurations, a locking or clamping arrangement is provided that holds the horizontal main shaft at winds up to 25 meters per second, or over 50 miles per hour. However, in many configurations, for safety reasons, the replacement of the gearbox is limited to conditions in which winds are not more than 8 meters per second, or about 18 miles per hour. In addition, many wind turbine configurations in which gearboxes are replaced have three blades on their rotors. Some configurations of the present invention rotate the blades so that one blade is pointed straight down and the other blades are in a rabbit ear configuration. In addition, in some configurations of the present invention, the blades are pitched at an angle to avoid rotational torque on the rotor based upon the prevailing wind direction and/or the wind turbine itself is yawed for the same purpose.

Figure 1:
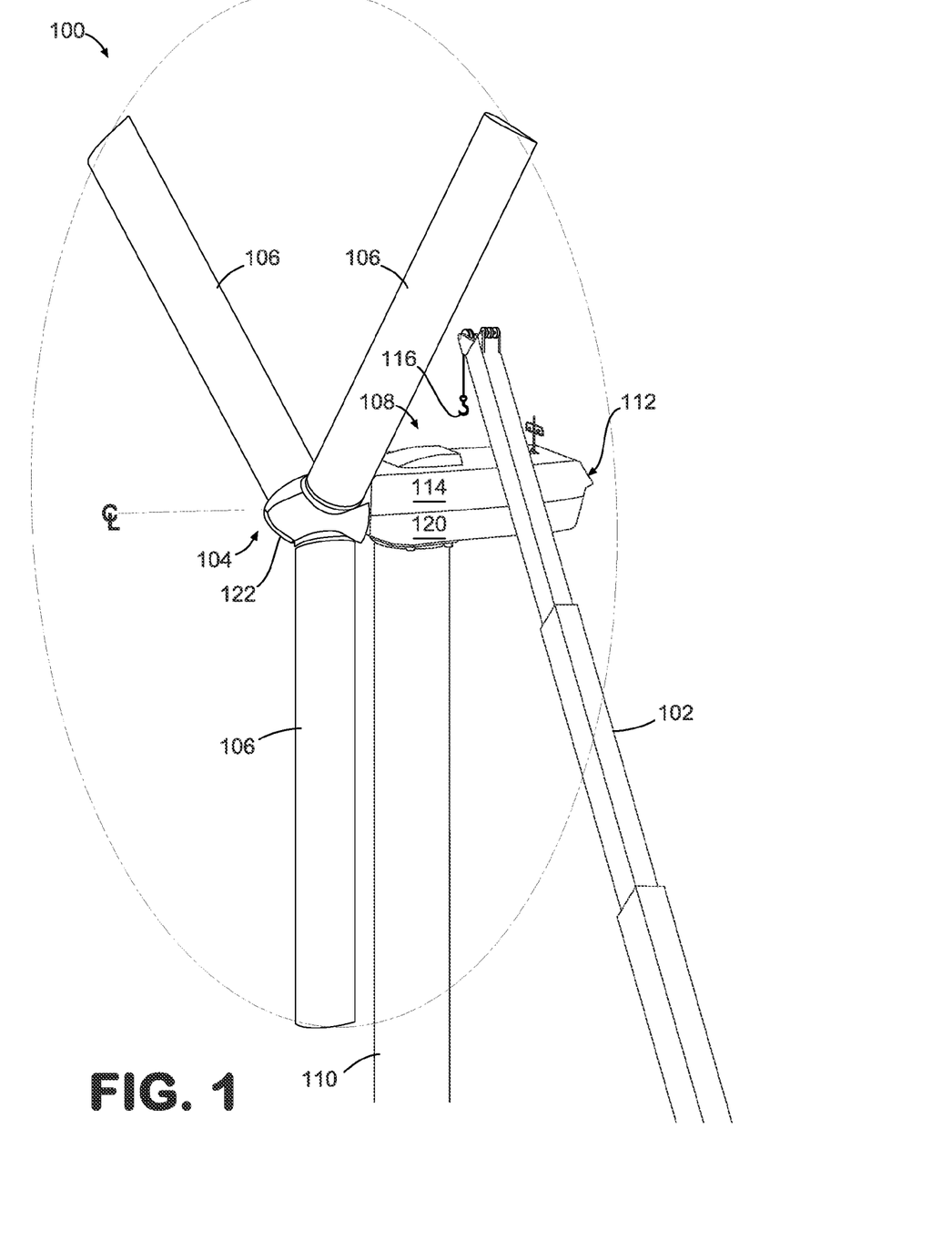
FIG. 1 is a perspective view of a wind turbine ready to have a gearbox replaced.
Figure 2:
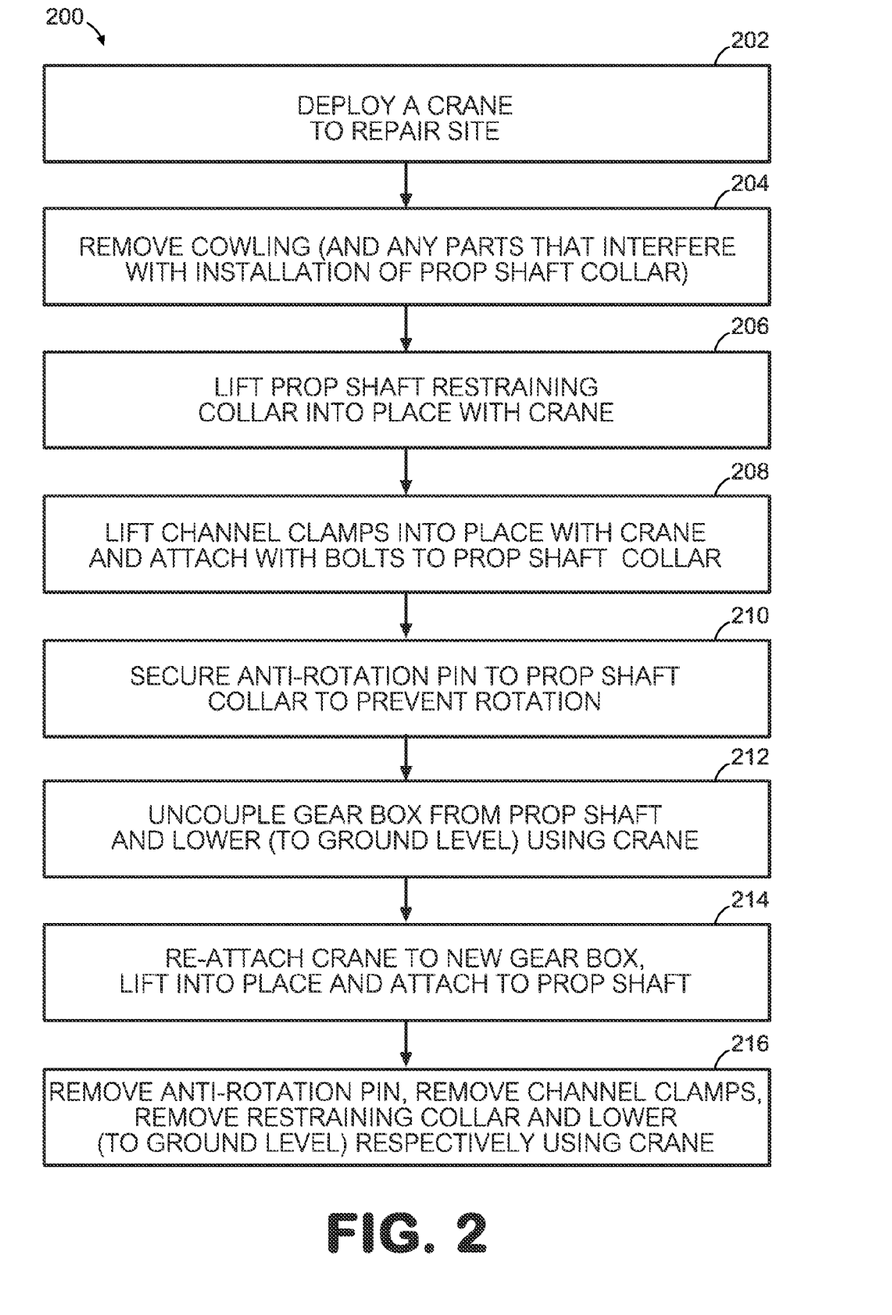
FIG. 2 is a flow chart representative of steps performed in some configurations of the present invention.
Figure 3:
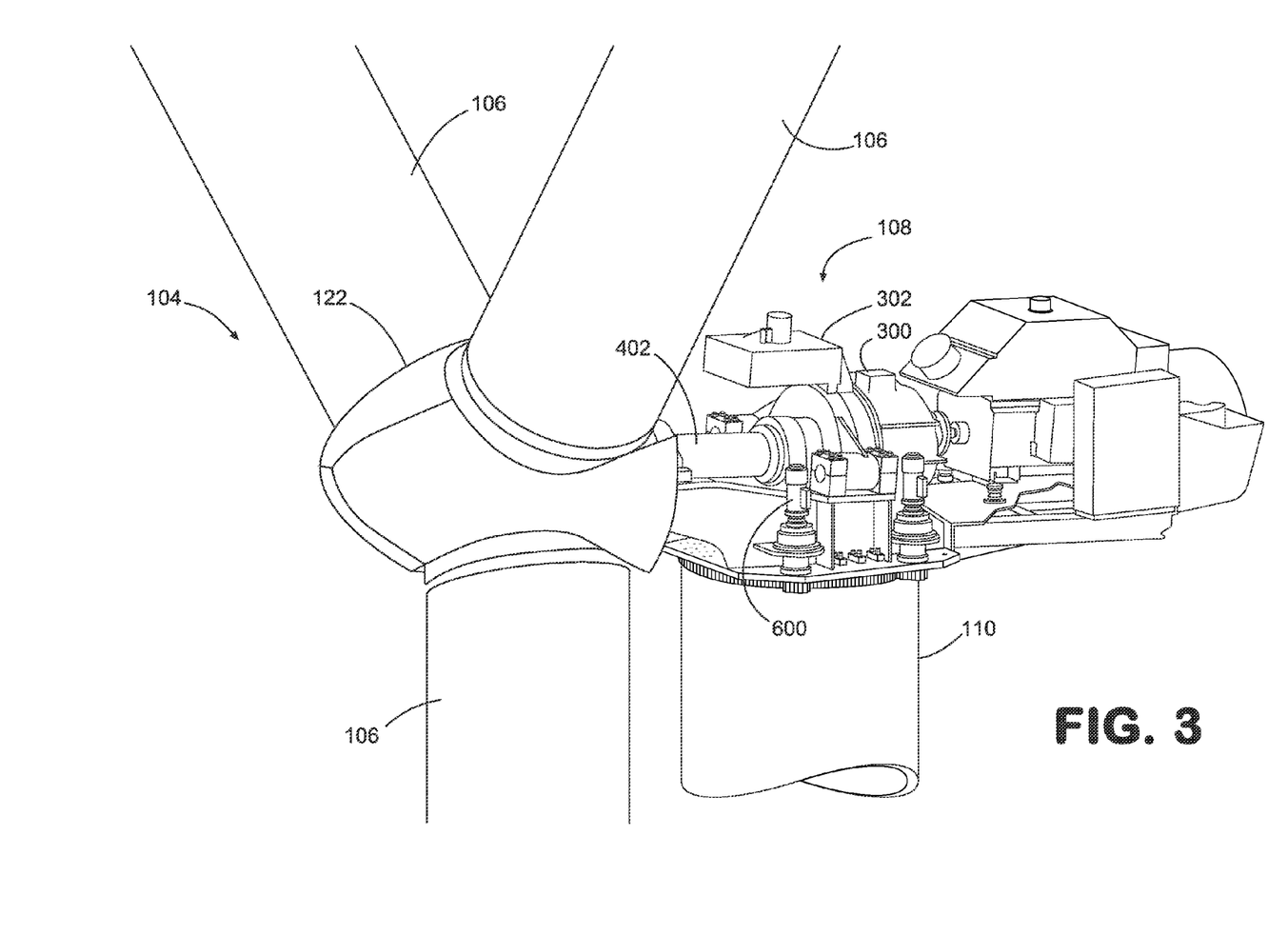
FIG. 3 is a perspective view of a wind turbine in a partial stage of disassembly.

More particularly and referring to FIG. 1, flow chart 200 of FIG. 2, and FIG. 3, in some configurations of the present invention, a gearbox 300 of a wind turbine 100 is removed using a single crane 102 that is deployed 202 to a repair site. Wind turbine 100 comprises a rotor 104 having at least one blade 106. In the most common configuration, rotor 104 has three blades 106, but configurations of the present invention are not limited to rotor configurations having a specific number of blades. Wind turbine 100 also comprises a nacelle 108 that is mounted atop a tower 110. Nacelle 108 houses various mechanical and electrical components of wind turbine 100, including gearbox 300. Nacelle 108 comprises a cowling 112, a top portion 114 of which is removed 204 at least in part by maneuvering hook 116 on crane 102 to a handle, hook, or other protuberance or opening of top portion 114 configured for the purpose, and lifting top portion 114 off. In many configurations, in addition to the steps discussed herein, bolts are removed to uncap pillow blocks, and after the pillow blocks are removed, a transmission and a yaw motor are both removed.

FIG. 3 is an illustration of nacelle 108 of wind turbine 100 with cowling top portion 114 removed. Other components of wind turbine 100 that interfere with the installation of a shaft-restraining collar (to be described below) are also removed, for example, oil cooler 302, as shown schematically in FIG. 4. To provide better visibility of components within nacelle 108. the bottom portion 120 of cowling 112 has been omitted from FIG. 3. However, it is not necessary to remove bottom portion 120 in many configurations of the present invention.

Figure 4:
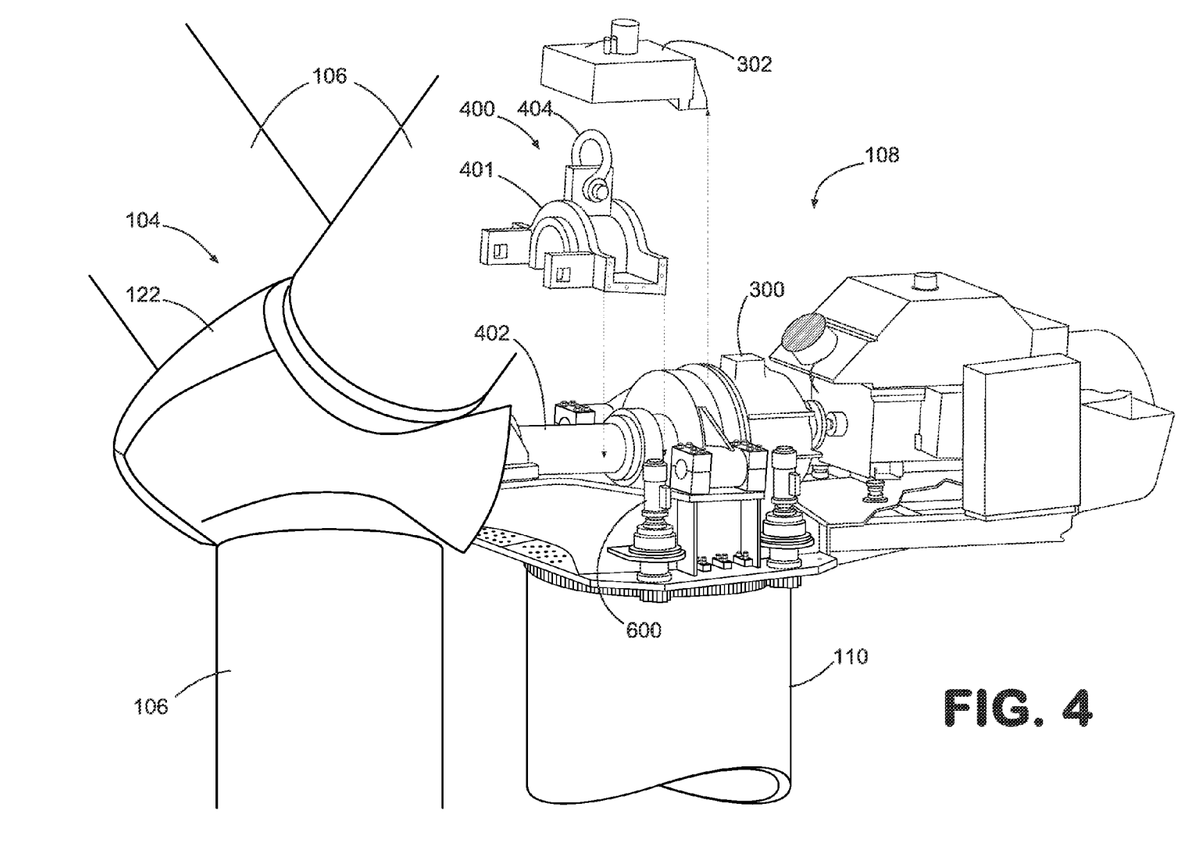
FIG. 4 is a perspective view of the wind turbine of FIG. 1 showing the removal of some of the components therein and the insertion of a shaft-restraining member as practiced in some configurations of the present invention.

Referring to FIG. 2 and FIG. 4, a shaft-restraining member or members 400 is then lifted 206 into place using crane 102 and hook 116. A hole or a handle 404 can be provided in member or members 400 to facilitate lifting. In some configurations of the present invention, shaft-restraining member or members comprise a half-spool member 401 that is used to restrain rotating shaft 402 (sometimes referred to herein as "main shaft") from tilting from its horizontal position when gearbox 300 is removed from wind turbine 100 without the removal of rotor 104. In some configuration of the present invention and referring to FIG. 5, shaft-restraining members 400 include under support members 500 that are mounted under main shaft 402. Half-spool member 401 and under support members 500 are configured in some configurations of the present invention to also inhibit rotation of shaft 402 due to wind on rotor 104 during at least a time before gearbox 300 is removed until after a replacement gearbox re-anchors shaft 402 in place.

Figure 5:
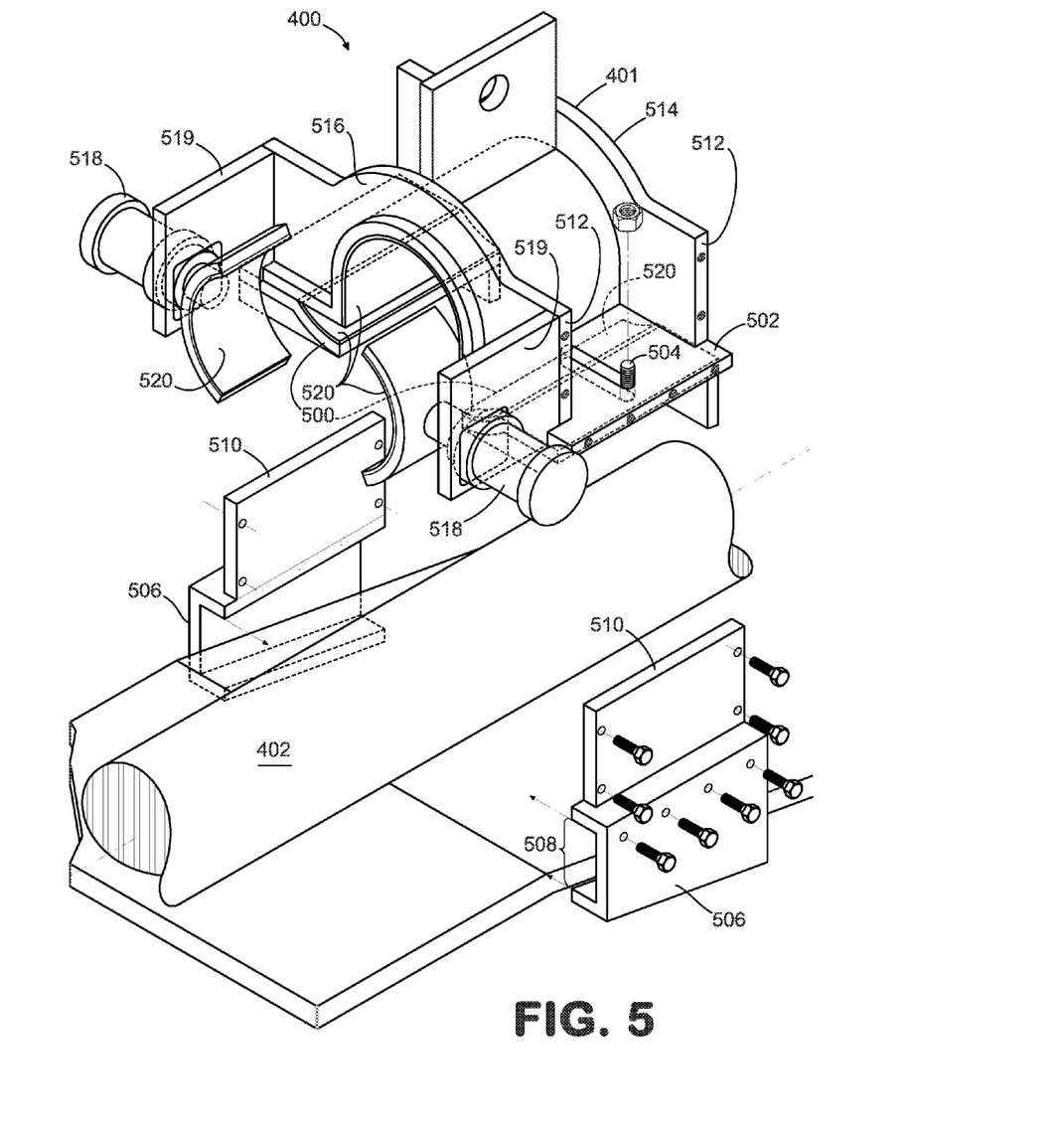
FIG. 5 is an exploded view of a portion of the wind turbine of FIG. 4, showing mounting details of the shaft-restraining member shown in FIG. 4 and additional shaft-restraining members.

Referring to FIGS. 2, 4, and 5, half-spool member 401 is fastened to wind turbine 100, for example, by bolting it 208 in place. For example, in some configurations of the present invention, half-spool member 401 includes mounting wings 502 on opposite sides, although only one mounting wing 502 is visible in FIG. 5. Each mounting wing 502 is configured to receive a bolt 504 therethrough to slidably engage under support members 500 until they are adjusted into position to support an underside of main shaft 402 and bolts 504 tightened. (In some configurations, bolts 504 are tightened onto spacers that are not shown in the Figures so that main shaft 402 is supported underneath by curved sections of under support members 500.) Also, each mounting wing 502 in some configurations is held in place using a channel clamp 506 having a U-shaped channel 508 that attaches onto a bedplate (not explicitly shown in FIG. 5) of wind turbine 100. Each channel clamp 506 is bolted to a respective mounting wing 502 at both ends of half-spool member 401. An additional stiffening plate 510 is bolted to flanges 512 protruding from spool ends 514 and 516 of half-spool member 401.

Hydraulic or mechanically operated friction brakes 518 are provided in some configurations to clamp main shaft 402 and thereby inhibit rotation of shaft 402. In some configurations, brakes 518 are provided on opposing brake support flanges 519 extending in an essentially axial direction from an end 516 of half-spool member 401. For example, brakes 518 comprise opposing cylinders each supported by one of the opposing brake support flanges 519. The hydraulic or mechanical clamping action of brakes 518 around main shaft 402 resists torque from rotor 104. (In some configurations, mechanical clamping action is or can be provided electromechanically.)

In some configurations, shaft-restraining members 400 are configured to allow for rotation of rotor 104 during high wind speed events that may occur during replacement of gearbox 300 to prevent damage to wind turbine 100 or the danger of heavy components that might shear off in such conditions. For example, surfaces 520 are Teflon™-covered or provided with roller bearing surfaces in some configurations that allow rotation of shaft 402 above a predetermined torque.

Figure 6:
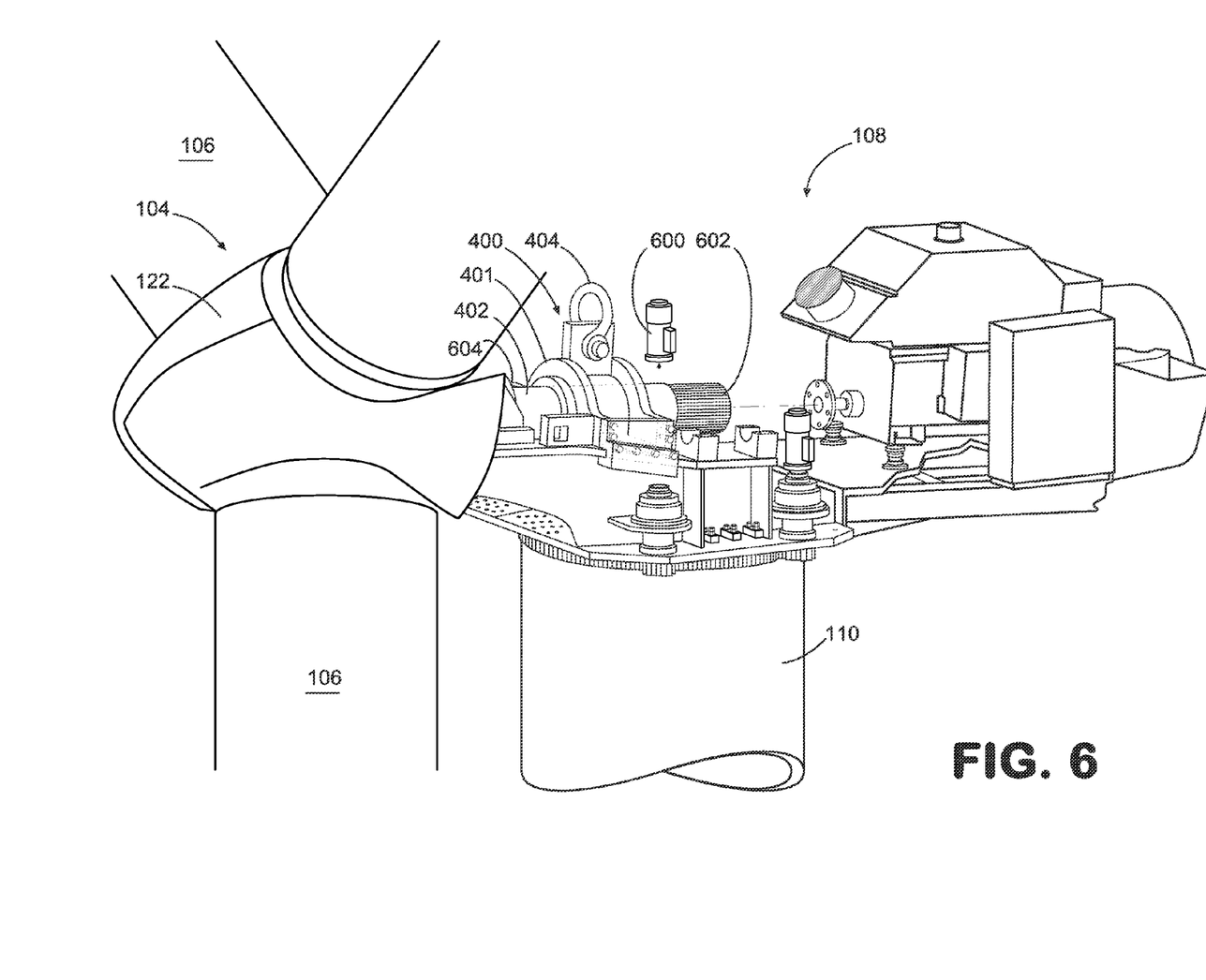
FIG. 6 is a perspective view of the wind turbine of FIG. 4 showing the gearbox removed and an end of the shaft exposed.

In some configurations and referring to FIG. 6, one or more yaw motors 600 are then secured 210 to main shaft 402 to prevent rotation of rotor 104. A yaw motor 600 may be located on each side of main shaft 402. Gearbox 300 is then removed 212 by uncoupling it from main shaft 402 and lowering it to the ground using crane 102. A replacement gearbox 300 is lifted using crane 102, put in place in nacelle 108 and attached 214 to main shaft 402, thereby re-anchoring first end 602 of shaft 402. Shaft-restraining member 400, which was fastened to wind turbine 100 to resist the tendency of shaft 402 to destabilize by tilting due to the weight of rotor 104 on second end 604 of shaft 402, is then removed 216 and lowered to the ground, using crane 102 as necessary. Top portion 114 of cowling 112 can then be lifted up and reattached to complete the servicing of wind turbine 100.

Figure 7:
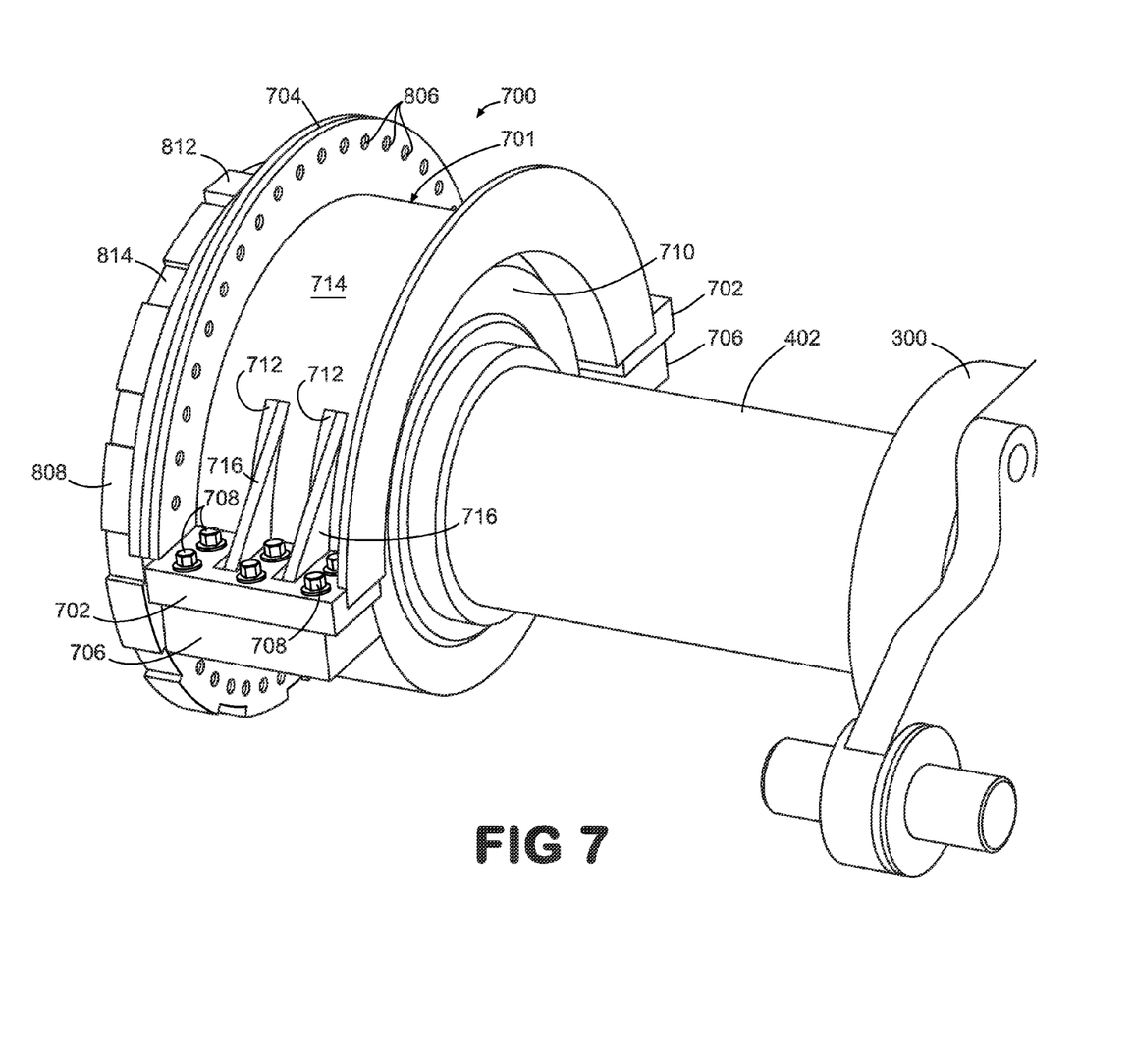
FIG. 7 is a partial perspective view of part of a shaft of a wind turbine, showing another configuration of shaft-restraining members (i.e., a rotor locks) of the present invention.
Figure 8:
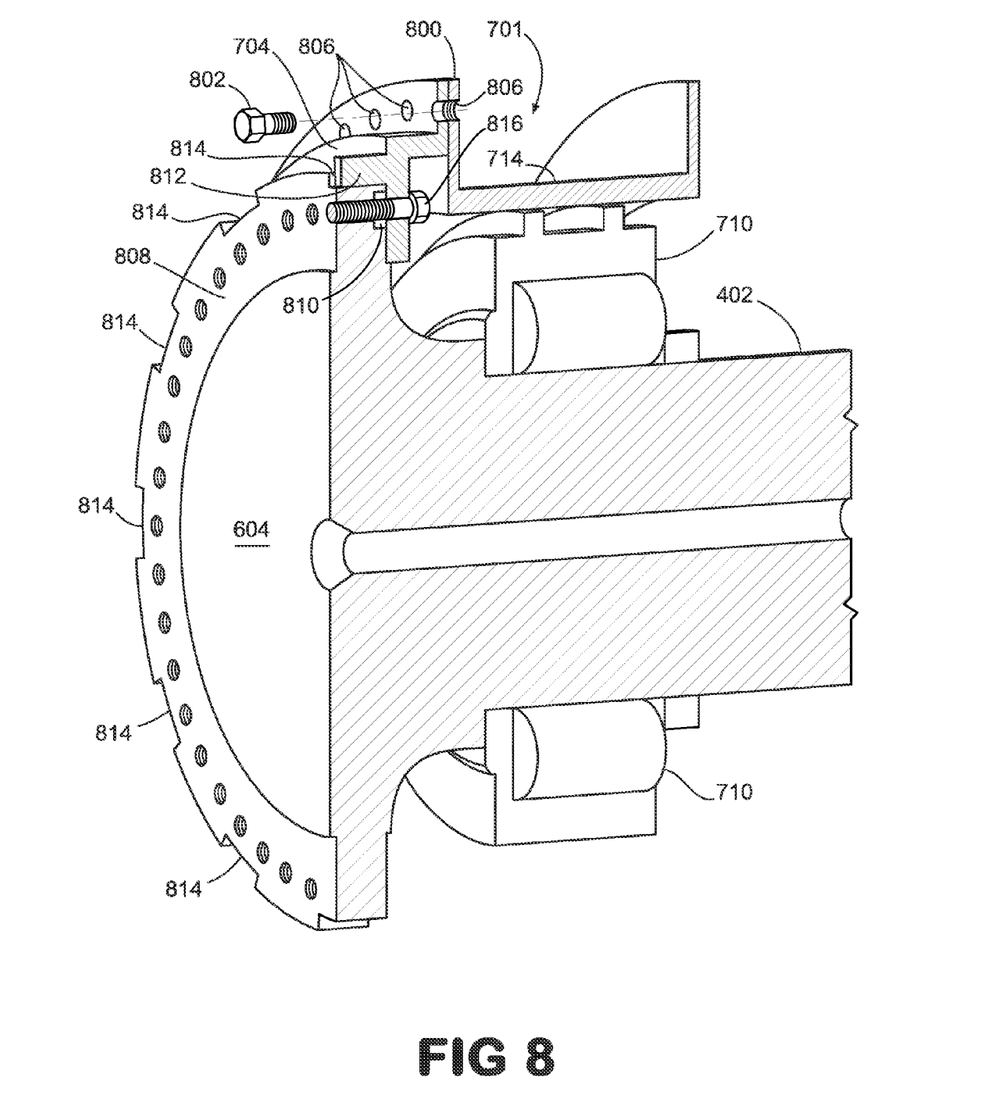
FIG. 8 is a cross-sectional perspective view of the shaft, the shaft-restraining members, and a journal or bearing of the shaft of FIG. 7.

In some configurations of the present invention and referring to FIGS. 7 and 8, shaft-restraining members are somewhat differently configured. For example, shaft-restraining members 700 in some configurations of the present invention comprise a somewhat differently configured half-spool member 701 having mounting ears or flanges 702 and a semi-annular member 704. Semi-annular member 704 is configured to mount between and fastened to an end 800 of half-spool member 701 using one or more bolts 802 tightened through holes 804 proximate the periphery of semi-annular member 704 and holes 806 through a periphery of end 800 of half-spool member 701. Semi-annular member 704 is also configured to mount onto a mounting flange 808 of shaft 402, or in some configurations, to hub 122 of rotor 104 (see FIG. 1).

More particularly, in some configurations, mounting flange 808 of shaft 402 comprises a trumpeted section having countersunk holes 810 that accommodate the heads of bolts (not shown in FIG. 8) that fasten hub 122 to flange 808. One or more of these bolts are removed and replaced with longer bolts 816 that are used to fasten semi-annular member 704 to mounting flange 808 on a side opposite hub 122 (not shown in FIG. 8), but many bolts are not removed. These bolts do not interfere with semi-annular member 704 because their heads are recessed into countersunk holes. In other configurations, holes are countersunk in semi-annular member 704 rather than in mounting flange 808 to allow a side of semi-annular member 704 to firmly contact flange 808. In either type of configuration, hub 122 and blades 106 need not be removed during the replacement of gearbox 300.

Figure 9:
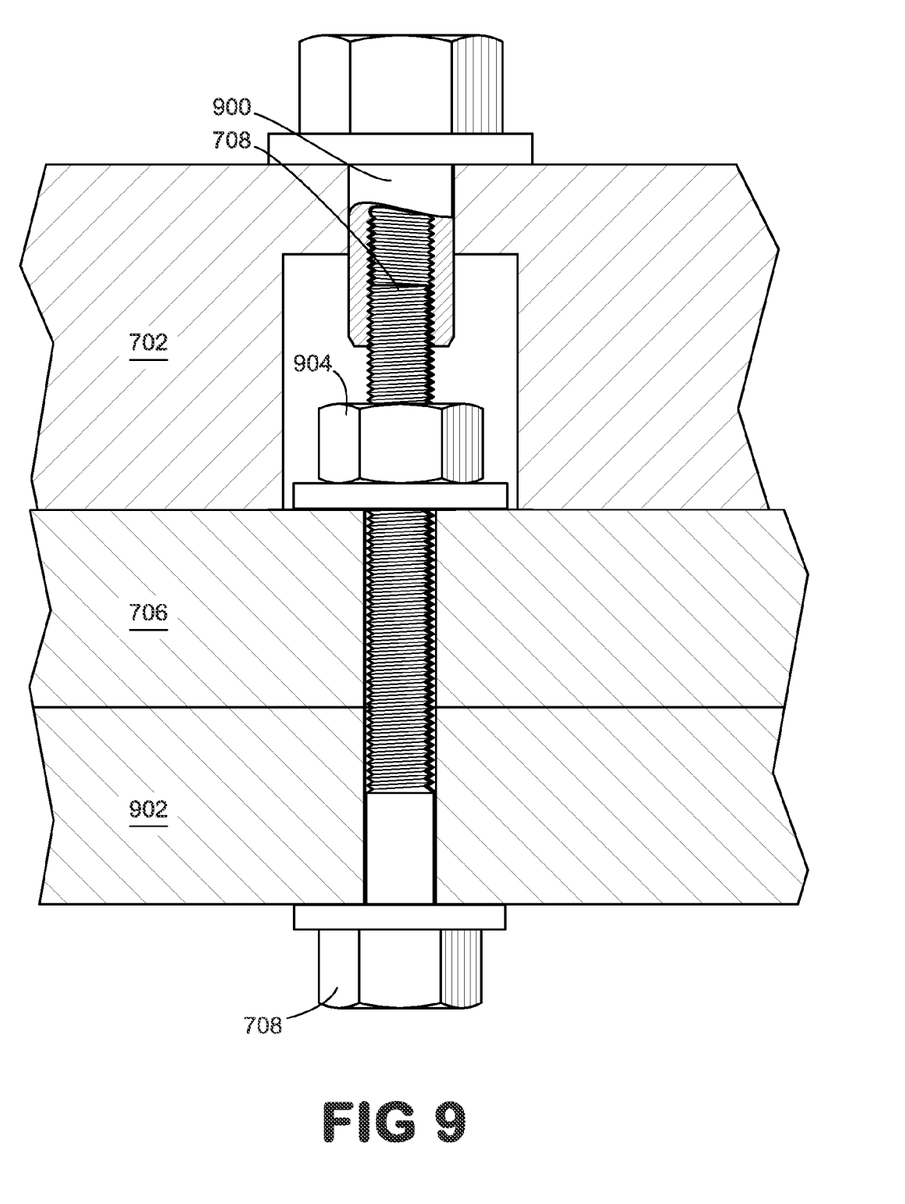
FIG. 9 is a cross-sectional view of a bolt configuration suitable for affixing a shaft-restraining member to a main bearing housing.

In some configurations and referring to FIGS. 7 and 9, half-spool member 701 is placed over main shaft 402, and more particularly over journal or bearing 710. Mounting ears or flanges 702 of half-spool member 701 are configured to rest atop mounting flanges 706 of a journal or bearing 710 around main shaft 402. For example, internally threaded bolts 900 are threaded onto a threaded end of existing bolts 708 that extend beyond nuts 904 that fasten mounting flanges 706 to bedplate 902 (not shown in FIG. 7). In this manner, half-spool member 701 is fastened to bedplate 902 of wind turbine 100. Slots 712 in mounting flanges 706 and in a cylindrical body portion 714 of half-spool member 701 provide clearance for gusset plates 716 of journal or bearing 710 to pass through.

By fastening semi-annular member 704 to mounting flange 806, half-spool member 701 to semi-annular member 704, and half-spool member 701 to mounting flanges 706 or to bolts 708 therein, shaft 402 is effectively restrained from tilting and its rotation effectively inhibited. Gearbox 300 can then be safely removed and replaced.

In some configurations and referring again to FIG. 8, semi-annular member 704 also includes one or more axially extending protuberances 812 such as a tooth, a key, or a wedge (for simplicity hereinafter, the term "tooth" is used generically to refer to protuberance 812). Tooth 812 engages an appropriately shaped gap 814 in a circumference of mounting flange 808 to effectively inhibit rotation of shaft 402. Some configurations provide more than one tooth 812, each engaging an appropriately shaped notch 814. Some configurations include one or more teeth 812 in addition to bolts 812 to fasten semi-annular member 704 to flange 808. Some configurations have one or more teeth 812 and do not use bolts 812 to fasten semi-annular member 704 to flange 808.

It will thus be appreciated that configurations of the present invention not only allow replacement of a heavy elevated object, e.g., a gearbox in a wind turbine, with only one crane, without removing the shaft that it is on or the hub or blades of a rotor at the opposite end of the shaft from the gearbox.

While the invention has been described in terms of various specific embodiments, those skilled in the art will recognize that the invention can be practiced with modification within the spirit and scope of the claims.

What is claimed is:

1. A method for replacing a first object in an apparatus at an elevated location, wherein the first object anchors a first end of an essentially horizontal shaft in the apparatus and wherein a weight of a second object at a second, opposite end of the shaft tends to destabilize the shaft from its essentially horizontal position when the first object is not present, said method comprising:

lifting a shaft-restraining member or members to the apparatus;

fastening the shaft-restraining member or members to the apparatus to thereby restrain the shaft from tilting when the first object is removed from the apparatus;

removing the first object from the apparatus with the shaft-restraining member or members fastened to the apparatus;

re-anchoring the first end of the shaft with a replacement object; and removing the shaft-restraining member or members from the apparatus after the shaft is re-anchored by the replacement object, wherein the apparatus is a wind turbine, the first object is a gearbox, the second object is a rotor of the wind turbine, and the replacement object is a replacement gearbox.

2. A method in accordance with claim 1 wherein the shaft is a rotating shaft, and said method further comprises inhibiting rotation of the shaft from a time before said removal of the first object and said re-anchoring of the first of the shaft.

3. A method in accordance with claim 1 wherein the apparatus is a wind turbine generator having a rotor, said lifting the restraining member to the apparatus further comprises utilizing a crane to lift at least one of the restraining members, and said replacing the first object is performed without removing the rotor from the wind turbine generator.

4. A method in accordance with claim 1 wherein said inhibiting rotation of the shaft comprises hydraulically clamping the shaft.

5. A method in accordance with claim 1 wherein said inhibiting rotation of the shaft comprises mechanically clamping the shaft.

6. A method in accordance with claim 1 wherein the restraining member comprises a half-spool member, under support members, channel clamps, and nuts and bolts, and said fastening the shaft-restraining member or members to the apparatus comprises attaching the channel clamps to a bed frame on opposite sides of the apparatus, adjusting the under support members to support an underside of the shaft, and bolting mounting wings at both ends of the half-spool member to said channel clamps.

7. A method in accordance with claim 1 wherein the shaft is a rotating shaft, the apparatus is a wind turbine, the first object is a gearbox, the second object is a rotor of the wind turbine, the replacement object is a replacement gearbox, and the shaft-restraining member or members comprise a half-spool member, wherein said fastening the shaft-restraining member or members to the apparatus further comprises mounting half-spool member over the shaft and fastening the half-spool member to a bedplate of the wind turbine.

8. A method in accordance with claim 7 wherein said mounting the half-spool member over the shaft comprises mounting the half-spool member over a bearing or journal of the shaft.

9. A method in accordance with claim 8 further comprising inhibiting rotation of the shaft from a time before said removal of the first object and said re-anchoring of the first of the shaft.

10. A method in accordance with claim 9 wherein said inhibiting rotation of the shaft further comprises:
engaging a gap in a circumference of a flange of a hub or rotor of the wind turbine or of the shaft proximate the hub or rotor of the wind turbine with a tooth extending axially from a half-annular member, fastening the half-annular member to the flange, and fastening the half-annular member to an end of the half-spool member.

11. A method in accordance with claim 8 wherein said mounting the half-spool member over the shaft comprises placing the half-spool member over the bearing or journal of the shaft so that mounting flanges of the half-spool member rest atop mounting flanges of the bearing or journal, and so that gusset plates of the bearing or journal are cleared through slots in the half spool member and the mounting flanges of the half-spool member.

12. A method in accordance with claim 8 wherein said mounting the half-spool member over the shaft further comprises placing the half-spool member over the bearing or journal of the shaft so that mounting flanges of the half-spool member rest atop mounting flanges of the bearing or journal, and fastening the mounting flanges of the half-spool member to the main bearing frame or journal using internally-threaded bolts threaded over ends of existing bolts.

\* \* \* \* \*